(12) United States Patent
Link et al.

(10) Patent No.: US 7,157,662 B2
(45) Date of Patent: Jan. 2, 2007

(54) COLLISION PROTECTION DEVICE OF A LASER PROCESSING HEAD

(75) Inventors: Gerhard Link, Knittlingen (DE); Jan Baur, Leinfelden-Echterdingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 11/012,729

(22) Filed: Dec. 16, 2004

(65) Prior Publication Data
US 2005/0184038 A1 Aug. 25, 2005

(30) Foreign Application Priority Data
Dec. 16, 2003 (EP) ................................ 030288351

(51) Int. Cl.
B23K 26/08 (2006.01)
B23K 26/42 (2006.01)
B25J 19/06 (2006.01)

(52) U.S. Cl. .............................. 219/121.78; 219/121.84

(58) Field of Classification Search ........... 219/121.78, 219/121.84, 121.48, 121.67; 403/11, 90, 403/13, 14; 200/248, 277; 307/326; 901/41, 901/46
See application file for complete search history.

(56) References Cited

U.S. PATENT DOCUMENTS

| 5,160,824 A | 11/1992 | Babel | |
|---|---|---|---|
| 5,243,264 A * | 9/1993 | Takada et al. | 403/90 |
| 5,678,944 A * | 10/1997 | Slocum et al. | 403/13 |
| 5,683,599 A * | 11/1997 | Ellis | 219/121.48 |
| 5,954,446 A * | 9/1999 | Ireland | 403/11 |
| 6,208,912 B1 * | 3/2001 | Russo et al. | 700/245 |
| 6,690,208 B1 * | 2/2004 | Gloden et al. | 307/326 |
| 6,740,844 B1 * | 5/2004 | Rossi | 219/121.59 |
| 6,822,187 B1 * | 11/2004 | Hermann et al. | 219/121.63 |

FOREIGN PATENT DOCUMENTS

| DE | 3523887 A1 * | 1/1987 |
|---|---|---|
| DE | 19701516 | 2/1998 |
| JP | 63-60094 A * | 3/1988 |
| JP | 3-90289 A * | 4/1991 |
| JP | 5-146889 A * | 6/1993 |
| JP | 5-337665 A * | 12/1993 |
| JP | 7-178546 A * | 7/1995 |
| JP | 2000-42778 A * | 2/2000 |
| JP | 2001-71165 A * | 3/2001 |

* cited by examiner

Primary Examiner—Geoffrey S. Evans
(74) Attorney, Agent, or Firm—Fish & Richardson P.C.

(57) ABSTRACT

A laser processing head collision protection apparatus includes a carrier member, and a laser processing head detachably coupled to the carrier member by a plurality of pairs of truncated cones.

9 Claims, 3 Drawing Sheets

COLLISION PROTECTION DEVICE OF A LASER PROCESSING HEAD

CLAIM OF PRIORITY

This application claims priority under 35 USC § 119 to European Patent Application Serial No. 030288351, filed on Dec. 16, 2003, the entire contents of which are hereby incorporated by reference.

TECHNICAL FIELD

The invention relates to laser processing and, more particularly, to a collision protection device of a laser processing head of a laser processing machine.

BACKGROUND

A collision protection device is disclosed in German Patent Serial No. DE 197 01 516 C1.

When operating a laser processing machine, damage to the machine or to the workpiece caused by collision between the laser processing head and the workpiece must be prevented, and any deviation of the laser processing head from its desired position after a collision between the head and the workpiece must be precisely detected.

Like the means disclosed in German Patent Serial No. DE 35 23 887, the above-mentioned conventional collision protection device also requires additional position control.

SUMMARY

The following discloses an improved collision protection device that provides for improved response behavior of a laser processing head in case of a collision with a workpiece, monitoring or control of the position of the laser processing head, and handling of the processing head during coupling. Truncated cones that facilitate centering of the head and that provide a high degree of safety for positioning during coupling of the head can be employed.

The coupling plane of a collision protection device can be disposed perpendicularly to the workpiece surface. Then, in case of collision with the workpiece, the coupling of the laser processing head can be released in almost any direction of collision.

Furthermore, the coupling of the laser processing head can be produced using an electromagnet and several permanent magnets, such that a high retaining force is combined with the ability to rapidly decrease the retaining force, such that laser processing accomplishes good retention of the laser processing head and, in case of a collision, fast release of the laser processing head.

An electric circuit that can be opened or closed in case of a collision between the laser processing head and the workpiece can be connected to a laser processing machine control for integrated position monitoring of the laser processing head and release of the coupling.

The electric circuit can be opened and closed by pressure pieces (e.g., rollers and/or balls and/or prisms) that are disposed on the laser processing head and that can be applied between truncated cones on the carrier. In such an arrangement, the apparatus for centering the laser processing head is part of the electric circuit that is opened in case of a collision.

The arrangement of three pairs of truncated cones on an annular flange of the carrier, between which one ball can be inserted in each case, ensures good centering, good position control and reliable collision protection. The release forces can be influenced through suitable selection of the angular separation between the truncated cone pairs such that preferably identical forces act in all collision directions. A first pair of truncated cones can be disposed on the side of the carrier facing away from the workpiece surface and the two other pairs of truncated cones can be disposed at an angular separation of approximately +135° or –135°. Such an arrangement is reasonable for a centering device having three bearings.

The coupling allows convenient exchange of the processing head at this interface of the processing head and the carrier.

In a first general aspect, a laser processing head collision protection apparatus includes a carrier member, and a laser processing head detachably coupled to the carrier member by a plurality of pairs of truncated cones.

Implementations can include one or more of the following features. For example, coupling surfaces of the carrier member and the laser processing head can define a coupling plane that is substantially perpendicular to a workpiece processing surface. The apparatus can further include a plurality of permanent magnets disposed on the carrier member or the laser processing head and coupling the laser processing head to the carrier member. The apparatus can further include an electromagnet disposed on the carrier member or the laser processing head and coupling the laser processing head to the carrier member. The apparatus can further include balls disposed on one of the carrier member or the laser processing head, such that each ball fits between a pair of the truncated cones to close an electrical circuit, and such that displacement of the laser processing head with respect to the carrier member causes a ball to be moved from contact with a pair of truncated cones and the circuit to open. The electrical circuit can be connected to a laser processing machine control. The apparatus can further include three pairs of truncated cones. One pair of truncated cones can be disposed facing away from an output side of the laser processing head and the two other pairs can be disposed at an angular separation of approximately +135° and –135° from the first pair. The pairs of truncated cones can be spaced apart about a circumference of the carrier member or the laser processing head.

In another general aspect, a laser processing head collision protection apparatus includes a carrier member and a laser processing head detachably coupled to the carrier member, such that coupling surfaces of the carrier member and the laser processing head define a coupling plane that is substantially perpendicular to a surface of the workpiece. Three pairs of truncated cones are disposed equidistantly around a circumference of the carrier member or the laser processing head and couple the laser processing head to the carrier member. A plurality of permanent magnets are disposed on the carrier member or the laser processing head and couple the laser processing head to the carrier member, and an electromagnet is disposed on the carrier member or the laser processing head and couples the laser processing head to the carrier member. Three balls are disposed on one of the carrier member or the laser processing head, and each ball fits between a separate pair of truncated cones to close an electrical circuit, such that displacement of the laser processing head with respect to the carrier member causes a ball to be moved from contact with a pair of truncated cones and the circuit to open.

In a further general aspect, a laser processing head collision protection system includes a carrier member and a laser processing head detachably coupled to the carrier member by a plurality of pairs of truncated cones. A plurality of permanent magnets is disposed on the carrier member or the laser processing head and couples the laser processing head to the carrier member, and an electromagnet is disposed on the carrier member or the laser processing head and coupling the laser processing head to the carrier member. A plurality of balls is disposed on one of the carrier member or the laser processing head and each ball fits between a separate pair of truncated cones to close an electrical circuit. A control circuit senses interruption of the electrical circuit when a ball is moved from contact with a pair of truncated cones.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
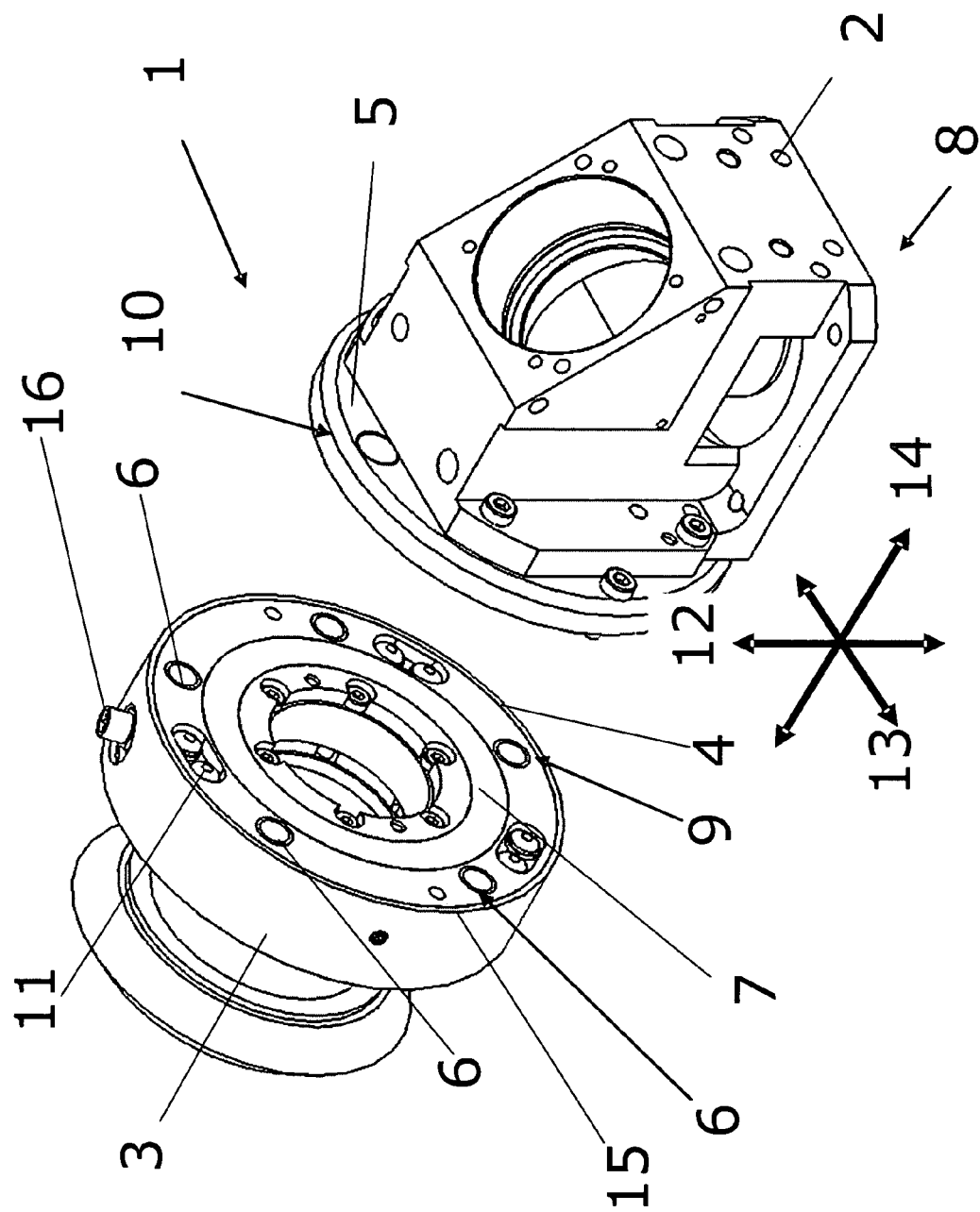
FIG. 1 is a schematic perspective view of a collision protection device of a laser processing machine.

FIG. 1 shows the construction of a collision protection device 1 of a laser processing machine. The collision protection device 1 includes a detachable coupling of a laser processing head 2 that can be held on a carrier 3 of the laser processing machine. The coupling includes a flange 4 that can hold a yoke plate 5 that is rigidly connected to the laser processing head 2, and that allows for stationary, however, detachable retention on the carrier 3.

The laser processing head 2 can be securely held on the flange 4 using a connectable annular electromagnet 7 and several circular permanent magnets 6. The static retention force opposing the weight of the laser processing head 2 is provided by the permanent magnets 6, and the required dynamic retention force is provided by the electromagnet 7. The magnetic forces provide a large retention force (500 N), yet allow the force to be decreased rapidly, such that release of the coupling in case of a collision of the laser processing head 3 with the workpiece is possible in almost any direction in space.

Changing the laser processing head 2 does not require suspension of mechanical parts. The electromechanical force is required only during operation and is switched off when changing the laser processing head 2 to facilitates replacement of the head 2.

The position of the laser processing head 2 can be precisely reproduced during mounting. Deviation from the desired position can be recognized with high resolution (e.g., to within approximately 0.2 mm). In case of collision of the laser processing head 2 with a workpiece, the laser processing head 2 and consequently the laser processing nozzle of the laser processing head 2, which is located on the lower side 8 of the head 2 but which is not shown in FIG. 1, can deflect with limited power in all three directions in space. The workpiece is scanned by the principle of the switching probe head known from coordinate measurement machines.

The coupling plane defined on one coupling side 9 by the flange 4 and on the other coupling side 10 by the yoke plate 5 is disposed perpendicular to the workpiece surface and separated from the laser processing nozzle. Bearings are formed by three pressure pieces (e.g., balls) on the yoke plate 5 and by six truncated cones 11 on the flange 4 that center the laser processing head 2. Possible sliding of the pressure pieces out of the space between the truncated cones 11 permits deflection or deviation perpendicular to the workpiece surface in the direction of the double arrow 12 parallel to the workpiece surface in the direction of the double arrow 13 and in the direction of the double arrow 14, and superposed to these directions. The abutment points of the pressure pieces on the truncated cones 11 are electrically connected in series. Thus, as long as all three pressure pieces abut the truncated cones 11, the circuit is closed.

Figure 4:
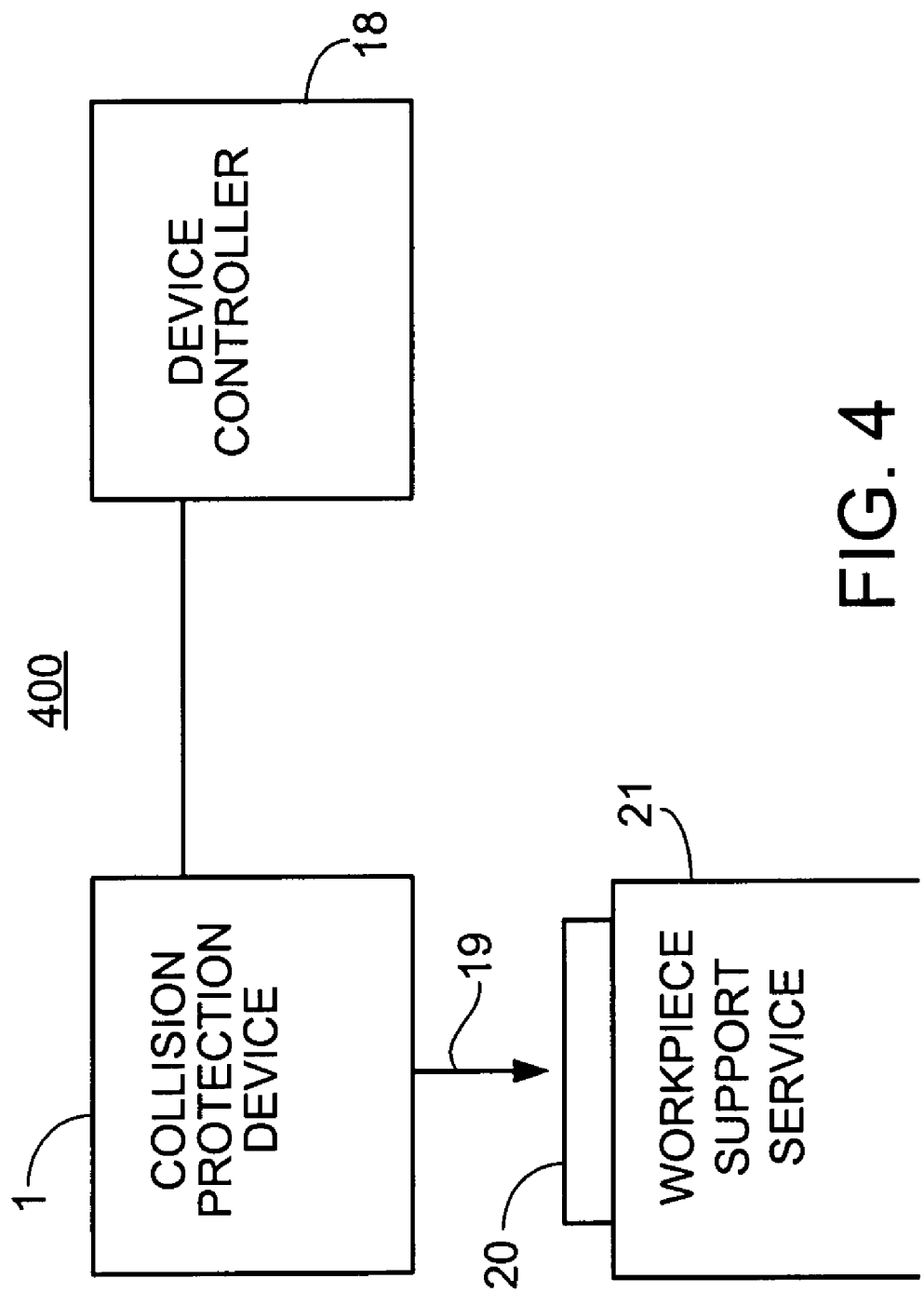
FIG. 4 is a schematic view of a collision protection system.

As shown in FIG. 4, the collision protection device 1 is electrically connected to a device controller 18. And the laser processing head 2 of within the device 1 directs a laser beam 19 toward a workpiece 20 supported on a workpiece support surface 21. During operation, when one of the pressure pieces (e.g., balls) is lifted out of contact with a pair of truncated cones 11 due to collision of the laser processing head 2 with the workpiece 20 or workpiece support structure 21, the circuit is interrupted, and a signal is recognized by the controller 18 of the laser processing machine, which causes laser processing to stop.

To enable permanent reproduction of the relative position between the carrier 3 and the laser processing head 2, the bearings are made of hardened steel. The bearings are guided in hard-anodized receptions of aluminum to electrically insulate them from each other and from the machine mass.

The beam guidance is sealed from the surroundings by a collar 15 and is made of a magnetic material, such that it is attracted to the yoke plate 5 by the magnetic force, thereby improving the magnetic flux without impairing sliding.

Instead of using permanent magnets and electromagnets, the carrier 3 can include hybrid magnets, only an electromagnet and remnant static retention force, or only permanent magnets. If only permanent magnets are used, the magnetic force during changing of the laser processing head may be overcome using a pressure device that may be in the form of a sliding connecting link that can be rotated about the coupling axis, and pressure pins. The pressure pins can serve at the same time as a preliminary guide for disposing the laser processing head. The connecting link can have a lever for generating the torque, which may also be a removable hook spanner.

Figures 2, 3:
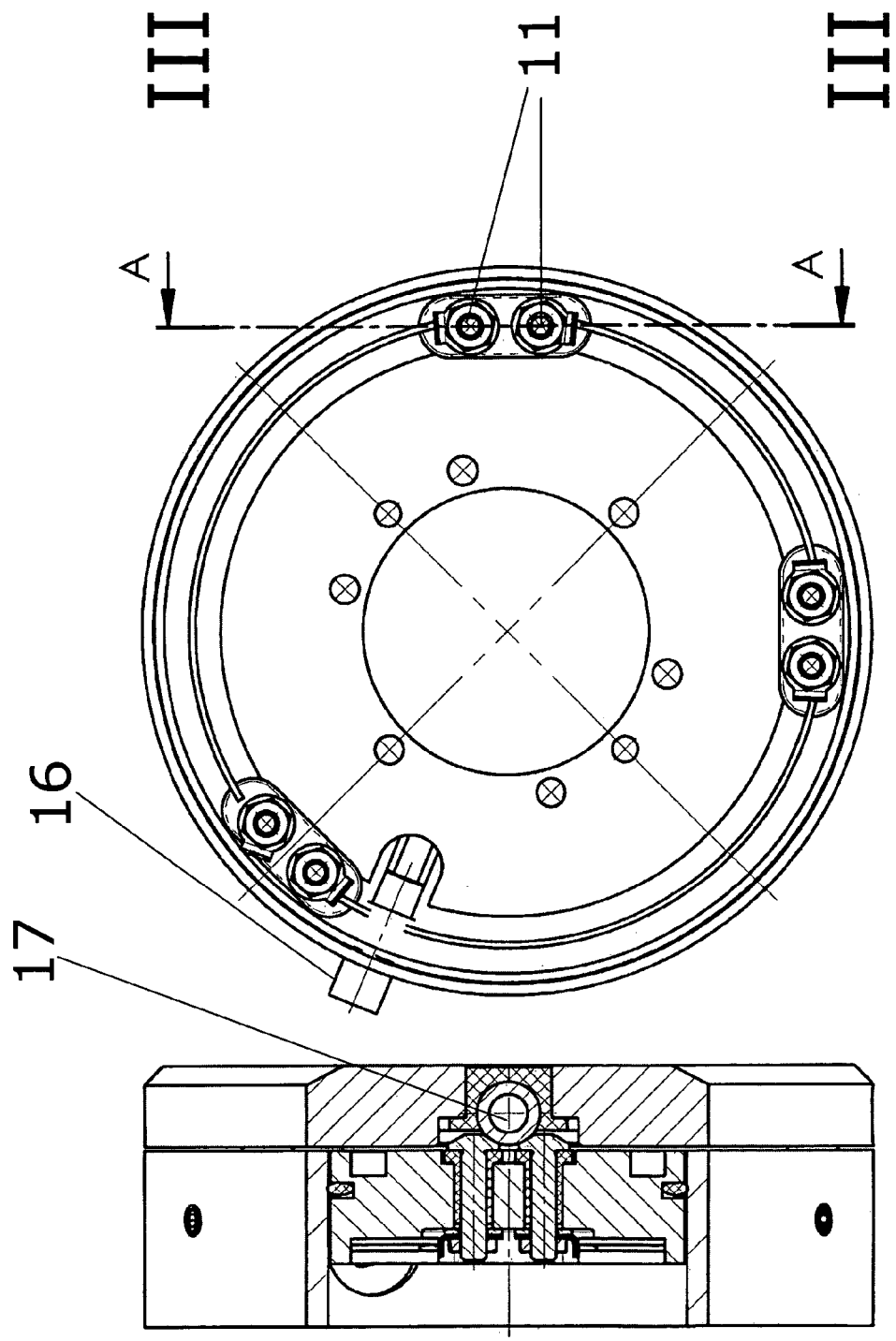
FIG. 2 is a schematic top view on the coupling side of a centering apparatus of the collision protection device.
FIG. 3 is a schematic sectional view through the plane III-III in FIG. 2.

FIG. 2 shows a top view on the coupling side (i.e., the carrier) of the centering apparatus. FIG. 3 shows a sectional view through a pair of truncated cones 11 with coupled yoke plate through plane marked III—III in FIG. 2. An electrical contact is provided between the two truncated cones 11 through the engaging pressure piece (e.g., a ball) 17. If the pressure piece 17 is lifted due to a collision, the circuit is interrupted. Connection of the truncated cones 11 to a current supply is provided by a connector 16.

FIG. 2 shows an arrangement of three pairs of truncated cones 11. A first pair of truncated cones 11 is disposed on the side (adjacent to the connector 16) facing away from the workpiece surface. The two other pairs are disposed at +135° or −135° around the circumference of the carrier 3 relative to the first pair of cones. This arrangement takes into account that, in case of a collision, the length of the engaging lever depends on the direction of collision.

A preferred implementations has been described. Nevertheless, it will be understood that various modifications may be made. Accordingly, other implementations are within the scope of the following claims.

What is claimed is:

1. A laser processing head collision protection apparatus comprising:
   a carrier member;
   a laser processing head detachably coupled to the carrier member by a plurality of pairs of truncated cones;
   a plurality of permanent magnets disposed on the carrier member or the laser processing head and coupling the laser processing head to the carrier member;
   an electromagnet disposed on the carrier member or the laser processing head and coupling the laser processing head to the carrier member; and
   balls disposed on one of the carrier member or the laser processing head, wherein each ball fits between one pair of the truncated cones to close an electrical circuit connected to a laser processing machine control, and further wherein displacement of the laser processing head with respect to the carrier member causes a ball to be moved from contact with the pair of truncated cones and the circuit to open.

2. The collision protection apparatus of claim 1, wherein coupling surfaces of the carrier member and the laser processing head define a coupling plane that is substantially perpendicular to a workpiece processing surface.

3. The collision protection apparatus of claim 1, wherein the pairs of truncated cones are spaced apart about a circumference of the carrier member or the laser processing head.

4. The collision protection apparatus of claim 1, wherein the laser processing head is detachably coupled to the carrier member by three pairs of truncated cones, and further wherein one pair of truncated cones is disposed facing away from an output side of the laser processing head and the two other pairs are disposed at an angular separation of approximately +135° and −135° from the first pair.

5. A laser processing head collision protection apparatus comprising:
   a carrier member;
   a laser processing head detachably coupled to the carrier member by a plurality of pairs of truncated cones; and
   balls disposed on one of the carrier member or the laser processing head, wherein each ball fits between one pair of the truncated cones to close an electrical circuit, and wherein displacement of the laser processing head with respect to the carrier member causes a ball to be moved from contact with the pair of truncated cones and the circuit to open.

6. The collision protection apparatus of claim 5, wherein the electrical circuit is connected to a laser processing machine control.

7. The collision protection apparatus of claim 5, wherein one pair of truncated cones is disposed facing away from an output side of the laser processing head and the two other pairs are disposed at an angular separation of approximately +135° and −135° from the first pair.

8. A laser processing head collision protection apparatus comprising:
   a carrier member;
   a laser processing head detachably coupled to the carrier member, wherein coupling surfaces of the carrier member and the laser processing head define a coupling plane that is substantially perpendicular to a surface of the workpiece;
   three pairs of truncated cones disposed equidistantly around a circumference of the carrier member or the laser processing head and couples the laser processing head to the carrier member;
   a plurality of permanent magnets disposed on the carrier member or the laser processing head and coupling the laser processing head to the carrier member;
   an electromagnet disposed on the carrier member or the laser processing head and coupling the laser processing head to the carrier member;
   three balls disposed on one of the carrier member or the laser processing head, wherein each ball fits between a separate pair of truncated cones to close an electrical circuit, and wherein displacement of the laser processing head with respect to the carrier member causes a ball to be moved from contact with a pair of truncated cones and the circuit to open.

9. A laser processing head collision protection system comprising:
   a carrier member;
   a laser processing head detachably coupled to the carrier member by a plurality of pairs of truncated cones;
   a plurality of permanent magnets disposed on the carrier member or the laser processing head and coupling the laser processing head to the carrier member;
   an electromagnet disposed on the carrier member or the laser processing head and coupling the laser processing head to the carrier member;
   a plurality of balls, each ball being disposed on one of the carrier member or the laser processing head and fitting between a separate pair of truncated cones to close an electrical circuit; and
   a control circuit for sensing interrupting of the electrical circuit when a ball is moved from contact with a pair of truncated cones.

* * * * *